United States Patent [19]

Ohashi

[11] Patent Number: 5,613,784
[45] Date of Patent: Mar. 25, 1997

[54] PRINTER AND PRINTING METHOD THEREBY

[75] Inventor: Koji Ohashi, Kanagawa, Japan

[73] Assignee: Fuji Xerox Co., Ltd., Tokyo, Japan

[21] Appl. No.: 521,413

[22] Filed: Aug. 30, 1995

[30] Foreign Application Priority Data

Aug. 31, 1994 [JP] Japan ................................ 6-206541

[51] Int. Cl.$^6$ ........................................... G06F 15/00
[52] U.S. Cl. ................................. 400/76; 395/114
[58] Field of Search ....................... 400/76; 395/115, 395/113, 114, 200, 250, 275

[56] References Cited

U.S. PATENT DOCUMENTS

| | | | |
|---|---|---|---|
| 5,327,526 | 7/1994 | Nomura et al. | 395/115 |
| 5,388,254 | 2/1995 | Betz et al. | 395/575 |

FOREIGN PATENT DOCUMENTS 2-113324  4/1990  Japan.

Primary Examiner—John S. Hilten
Attorney, Agent, or Firm—Finnegan, Henderson, Farabow, Garrett & Dunner, L.L.P.

[57] ABSTRACT

The printer accepts the print request sent through the network and temporarily stores the image information to be printed in the image signal storage unit and the corresponding setting information into the setting information storage unit. The print request value calculation unit calculates the print request value on the basis of the setting information stored in the setting information storage unit. The printing operation boundary value is set through the manager interface and held in the printing operation boundary value holding unit. The print request value calculated by the print request value calculation unit is compared with the printing operation boundary value at the comparison unit. When the print request value exceeds the printing operation boundary value, the comparison unit delivers the print start signal to the image output unit to thereby continuously print image information corresponding to the print requests having been stored.

10 Claims, 2 Drawing Sheets

PRINTER AND PRINTING METHOD THEREBY

BACKGROUND OF THE INVENTION

The present invention relates to a printer which is connected to a computer network, for example, so that the printer is shared by a plurality of users, and a printing method thereby.

In general, an electrophotographic copying machine or a printer is required to drive a photosensitive drum for a predetermined time in advance upon starting the printing operation so as to stably drive the photosensitive drum and stabilize the voltage of the photosensitive drum. Further, after completion of the printing operation, the photosensitive drum is required to be driven for a predetermined period so as to perform the post printing operation such as the removal of the toner remained after the transfer process of the last sheet to be printed and the removal of the history of the formed image.

The life time of the photosensitive drum is known to be determined substantially by the abrasion amount of the photosensitive layer. The abrasion amount is substantially proportional to the rotation time period of the photosensitive drum, so that the higher the ratio of the actual printing time period with respect to the rotation time period of the photosensitive drum (that is, using efficiency of the photosensitive drum) is, the larger the number of sheets being printed within the life time of the photosensitive drum becomes. That is, it has been known that the more effectively the photosensitive drum is used, the lower the printing cost per one sheet becomes.

FIG. 2 is a graph showing a relation between the printed sheet number and the rotation number of the photosensitive drum per one printed sheet. The relation shown in FIG. 2 is calculated under a condition that a Black & White small printer is used, a photosensitive drum with φ30 is used, the photosensitive drum is required to be rotated by one revolution each upon starting and completing the printing operation, a sheet of A4 size is fed to the longitudinal direction thereof, and an interval of sheets to be continuously printed is 25 mm. When the printed sheet number and the rotation number of the photosensitive drum per one sheet are briefly calculated under such a condition, the relation shown in FIG. 2 is obtained. In this respect, the rotation number of the photosensitive drum per one sheet is inversely proportional to the continuously printed sheet number. Thus, when the continuously printed sheet number is small, a ratio of the rotation number of the photosensitive drum required upon starting and completing the printing operation with respect to the total rotation number from the start to the completion of the printing operation will be large, and hence the rotation number of the photosensitive drum per one sheet will be large. In contrast, when the continuously printed sheet number becomes large, the rotation number of the photosensitive drum required upon starting and completing the printing operation will less influence to the rotation number of the photosensitive drum per one sheet. It will be understood from the graph shown in FIG. 2 that, when the continuously printed sheet number is not more than five, the rotation number of the photosensitive drum per one sheet rapidly decreases with the increase of the continuously printed sheet number. Accordingly, it will be understood that this printer is disadvantageous in view of printing cost when the continuously printed sheet number is not more than four. In order to improve such disadvantage, it is important to decrease to the utmost the rotation number of the photosensitive drum required upon starting and completing the printing operation or to increase the continuously printed sheet number. While the explanation has been made as to the photosensitive drum, it has been found that the aforesaid fact is applied to elements other than the photosensitive drum such as a cleaning blade, brush, corotron, fuser roll or the like.

A tandem type color printer of belt transfer type has been known as an example of the printer. FIG. 3 shows a diagram showing the construction of an example of the tandem type color printer. In the figure, a reference numeral 1 depicts a transfer belt and 2 to 5 depict photosensitive drums. This color printer is provided with image forming units for colors K (black), Y (yellow), M (magenta) and C (cyanogen) to be used, respectively, for example. The photosensitive drums 2 to 5 are arranged at the image forming units, respectively. The toner images formed on the photosensitive drums 2 to 5 are sequentially transferred to a sheet which is electrostatically adsorbed on the transfer belt 1 and then fused, whereby a color image is formed on the sheet.

The transfer belt 1 is formed by adhesively connecting opposite ends of a dielectric sheet so as to shape a belt-like configuration. Thus, the transfer belt includes a seam portion. Since the seam portion is not suitable for the transfer operation, it is necessary to detect the seam portion of the transfer belt and control the printer so that a sheet is not positioned on the seam portion. To this end, a mark corresponding to the seam portion is formed on the transfer belt so that the seam portion is detected by optically detecting the mark.

An example of such a color printer is configured that a process speed is 200 mm/sec, the peripheral length of the transfer belt 1 is 2000 mm, the diameter of each of the photosensitive drums 2 to 5 is 80 mm and a distance between the shafts of the adjacent photosensitive drums is 200 mm.

When the printer is started, all the photosensitive drums 2 to 5 and the transfer belt 1 are operated. Firstly, the seam portion of the transfer belt 1 is detected and the transfer belt is controlled in its timing so that the sheet is not placed on the seam portion. Then the sheet is adsorbed on the transfer belt 1 and sequentially fed to the image forming units. Toner images are formed on the respective photosensitive drums 2 to 5 and transferred on the sheet. After the transfer process, the photosensitive drums 2 to 5 and the transfer belt 1 are cleaned, whereby the printing operation is completed.

In such a printing operation, in order to obtain one printed sheet, the transfer belt 1 is moved so that the toner images formed on the four photosensitive drums 2 to 5 are sequentially transferred to a sheet. Thus, the printing cost per one sheet of such a color printer will be four times as large as that of the Black & White printer. Further, each of the photosensitive drums 2 to 5 for the respective colors are required to be rotated excessively so as to move a sheet by a distance corresponding to the respective intervals between the adjacent photosensitive drums. Further, since the transfer belt 1 is controlled in its position so that a sheet is not positioned on the seam portion, the photosensitive drums are inevitably required to be rotated excessively. In this manner, the color printer shown in FIG. 3 requires the aforesaid sequential transfer operations by the photosensitive drums 2 to 5, the excessive rotation of the photosensitive drums 2 to 5 due to the intervals thereof, the positional control of the transfer belt for avoiding the seam portion or the like, whereby the printing cost per one sheet of such a color printer will be four times or more as large as that of the Black & White printer.

As a result, when the continuously printed sheet number is small, the printing cost per one sheet will remarkably increase with the decrease of the printed sheet number in the case of the color printer when compared with the Black & White printer.

In the case of continuously printing a plurality of images, since sheets can be fed with an interval of 40 mm in a case of A4 size sheet, for example, the operation time period per one sheet required for the printing operation will decrease with the increase of the continuously printed sheet number. Table 1 is a diagram used for explaining an example of the relation between the continuously printed sheet number and the respective operation time periods per one sheet. As shown in the figure, a time period required for detecting the seam portion before the printing operation and a time period required for the cleaning operation after the completion of the printing operation are set to be fixed time periods. As will be apparent from Table 1, the operation time period required for printing one sheet is inversely proportional to the continuously printed sheet number like the case of FIG. 2. As described above, since the life time of the photosensitive drum is substantially proportional to the operation time period of the image forming unit, the printing cost per one sheet can be decreased with the increase of the continuously printed sheet number.

The color printer shown in FIG. 3 has been developed in particular so as to print a large number of sheets at a high speed. In most cases, such a color printer is connected to a network or the like and shared by many users, for example. Further, a printer capable of being connected to a plurality of host devices is disclosed in JP-A-2-113324, for example. Such a printer shared by many users will be placed in general at a common place such as a central printing room in view of the using state thereof. In this case, since the printer is accessed at random by many users, the average value of the continuously printed sheet number decreases. Accordingly, such a color printer is disadvantageous in that the printing cost is high.

SUMMARY OF THE INVENTION

The present invention intends to provide a printer which is capable of reducing a printing cost per one sheet, and a printing method thereby.

The present invention is characterized in that, in a printer, the printer includes storage means for temporarily storing image information and setting information, boundary value storage means for storing a boundary value for starting printing operation, calculation means for calculating a print request value on the basis of the setting information stored in the storage means, comparison means for comparing the boundary value stored in the boundary value storage means with the print request value calculated by the calculation means, and control means for performing control operation to perform printing operation when it is determined by the comparison means that the print request value exceeds the boundary value.

The printer may be configured in a manner that the setting information includes information as to a time period required for the printing operation such as a color mode, sheet size, sheet feeding directions, number of printing copies or the like, and the calculation means calculates the print request value on the basis of the information as to the time period required for the printing operation.

The printer may be configured in a manner that the setting information includes, together with the information as to the time period required for the printing operation, information as to a degree of urgency of printing such as a print request level, a request start time or the like, and the calculation means calculates a product of coefficients which are set on the basis of the information as to the time period required for the printing operation and the information as to the degree of urgency of printing and further calculates a sum of respective products to thereby obtain the print request value.

The printer may be configured in a manner that a maximum waiting time period is set as another of the boundary value stored in the boundary value storage means, the setting information includes a request start time, the calculation means calculates a time difference between the request start time and a current time, the comparison means compares the time difference with the maximum waiting time period, and the control means performs the control operation to start the printing operation when the time difference exceeds the maximum waiting time period.

According to the present invention, the boundary value for starting the printing operation is stored and the print request value is calculated on the basis of the setting information corresponding to the image information to be printed. The boundary value is compared with the print request value and the printing operation is started when the print request value exceeds the boundary value. That is, the image information to be printed has been stored until the print request value exceeds the boundary value, and then the thus stored image information is continuously printed when the print request value exceeds the boundary value. The boundary value may be the number of sheets to be printed necessary to start the printing operation (the print start sheet number) which can be arbitrarily set by a printer manager. The print request value may be the number of sheets for printing the image information (the sheet number to be printed). When the sheet number to be printed exceeds the print start sheet number, the image information heretofore stored can be printed continuously. Thus, the number of sheets to be continuously printed can be made larger than almost a predetermined number, so that the printing cost per one sheet can be decreased. Further, when the printer manager sets the boundary value, the manager is able to manage the printing cost per one sheet.

The printer may be configured so that the setting information includes the information as to the time period required for the printing operation such as the color mode, sheet size, sheet feeding direction, the number of sheets to be printed or the like. Since the time period required for the printing operation differs depending on the color mode designating a Black & White printing or a color printing, sheet size, sheet feeding direction or the like, the print request value is calculated in view of such information, whereby the printing cost per one sheet can be managed in detail.

Further, the setting information may include information as to the degree of urgency of printing such as a print request level, a request start time or the like, and the product of coefficients which are set on the basis of the information as to the time period required for the printing operation and the information as to the degree of urgency of printing may be calculated and further the sum of the respective products may be calculated to thereby obtain the print request value. Accordingly, the start of the printing operation can be controlled in view of the degree of urgency of the image information to be printed.

Furthermore, the printer may be configured in a manner that the maximum waiting time period is set as another of the boundary value and the setting information includes the request start time. Then, the time difference between the request start time and the current time is compared with the maximum waiting time period so that the printing operation is started when the time difference exceeds the maximum waiting time period. As a result, it is possible to prevent such a state that the printing operation has not been performed for a long time when the frequency of usage of the printer is small.

Table 1 explains an example of the relation between the continuously printed sheet number and the respective operation time periods per one sheet.

Table 2 explains an example of the size coefficient S.

DETAILED DESCRIPTION OF THE PREFERRED EMBODIMENTS

Figure 1:
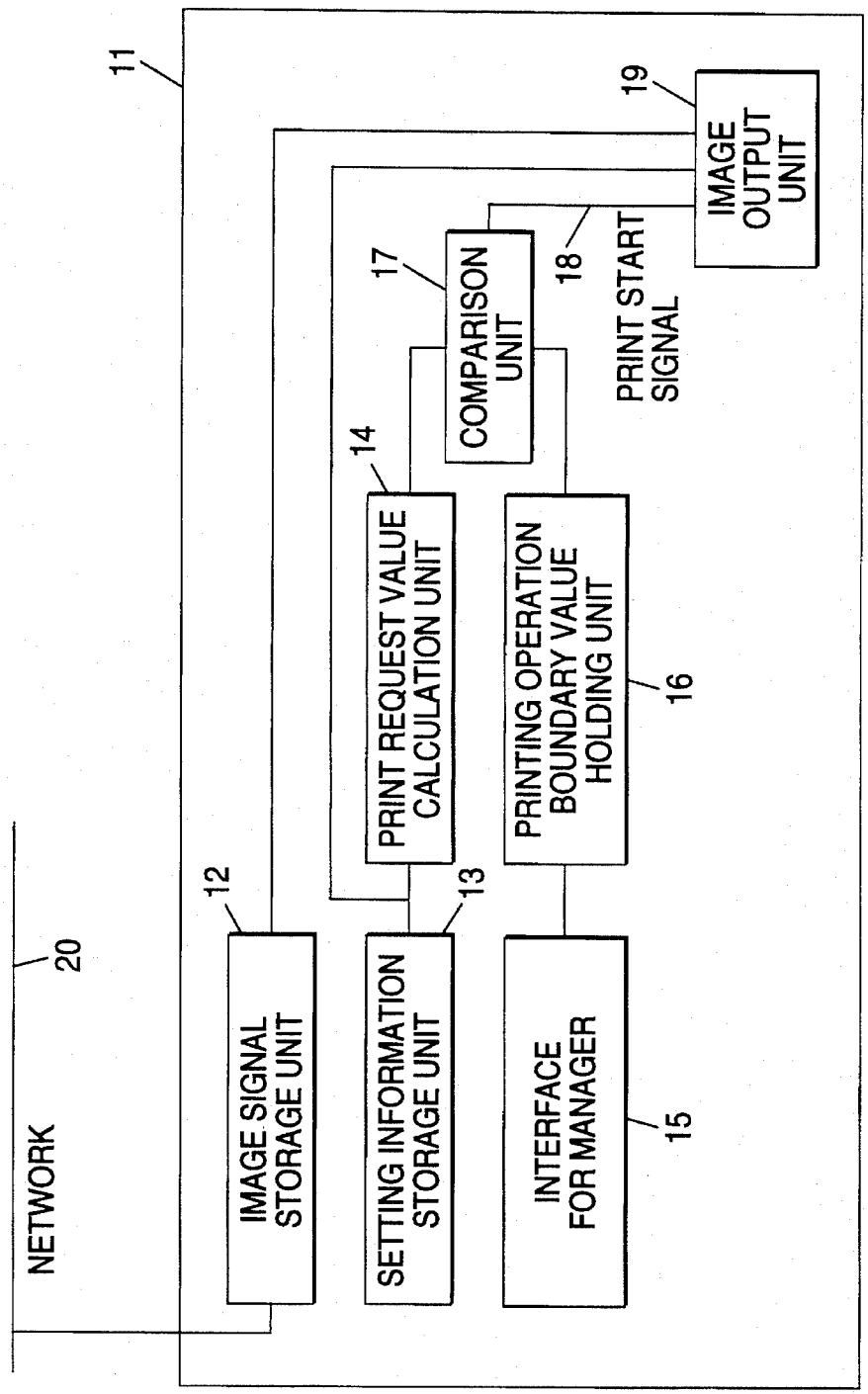
FIG. 1 is a schematic diagram showing a printer according to an embodiment of the present invention.
Figure 2:
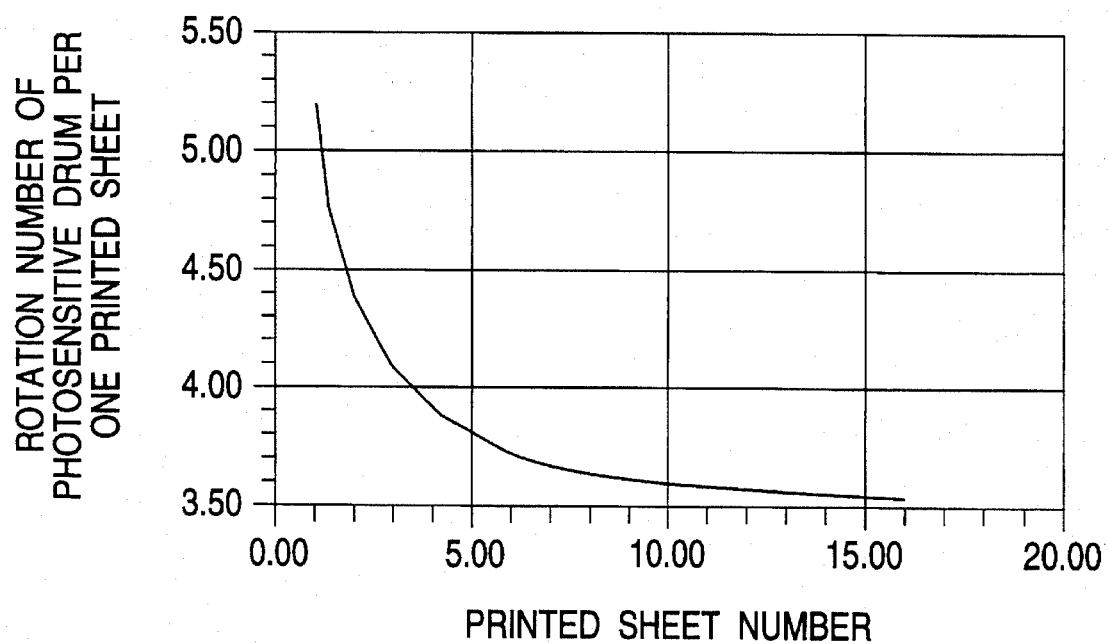
FIG. 2 is a graph showing an example of the relation between the printed sheet number and the rotation number of the photosensitive drum per one printed sheet.

FIG. 1 is a schematic diagram showing a printer according to an embodiment of the present invention. In the drawing, a control device will be explained with reference to the block diagrams shown in FIG. 3. In FIG. 1, a reference numeral 11 depicts a printer, 12 an image signal storage unit, 13 a setting information storage unit, 14 a print request value calculation unit, 15 an interface for manager (manager interface), 16 a printing operation boundary value holding unit, 17 a comparison unit, 18 a print start signal, 19 an image output unit and 20 a network. In the example shown in FIG. 1, the printer 11 is connected to the network 20 so that the printer is able to accept print requests from many users. The printer 11 includes the image signal storage unit 12, setting information storage unit 13, print request value calculation unit 14, manager interface 15, printing operation boundary value holding unit 16, comparison unit 17, image output unit 19 etc.

The image signal storage unit 12 and the setting information storage unit 13 temporarily store image information and setting information sent through the network 20, respectively. The setting information storage unit 13 stores the setting information such as a color mode for designating a Black & White printing or a color printing, a sheet size, a sheet feeding direction for designating longitudinal feeding or transverse feeding, the number of printing copies or the like. Other various information may be added to the setting information. For example, when the printer is capable of printing on both sides of a sheet automatically, information for designating a one-side (simplex) printing or a both-side (duplex) printing may be added as the setting information. When the printer is capable of only Black & White printing, the setting information for designating color mode may be deleted. In this manner, information to be included in the setting information may be selected at the time of designing the printer. The print request value calculation unit 14 obtains a time to start the printing operation by integration on the basis of the setting information stored in the setting information storage unit 13.

A print operation boundary value is a condition for starting the printing operation. A manager for the printer sets a printing operation boundary value by using the manager interface 15. The manager is able to set a printing operation boundary value suitably by taking cost and waiting or queuing time into consideration on the basis of the using state of the printer 11. The printing operation boundary value holding unit 16 holds the printing operation boundary value set by the manager interface 15.

The comparison unit 17 compares the print request value calculated by the print request value calculation unit 14 with the printing operation boundary value held in the printing operation boundary value holding unit 16, and then outputs the print start signal 18 to the image output unit 19 when the print request value exceeds the printing operation boundary value. The comparison unit 17 may perform the comparison operation at every reception of the print request or at every predetermined time.

Figure 3:
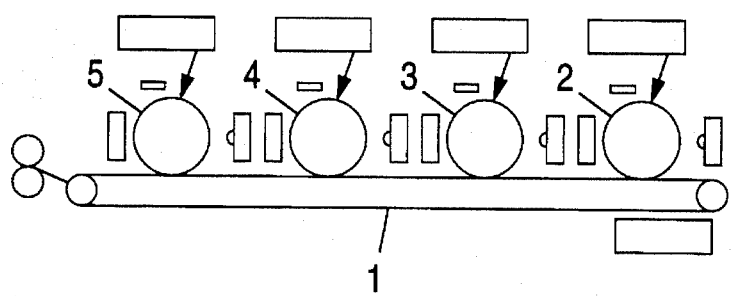
FIG. 3 is a diagram showing the construction of an example of a type color printer.

The image output unit 19 starts the printing operation in response to the print start signal 18 in a manner that the image output unit prints on a sheet image information, character information or the like stored in the image signal storage unit 12 in accordance with the setting information held in the setting information storage unit 13. The image output unit 19 may be configured to have a print mechanism with a single photosensitive drum for performing Black & White print, or to have a color print mechanism of belt transfer type with a plurality of photosensitive drums as shown in FIG. 3.

The print request value calculation unit 14 may be configured to obtain the print request value by using a size coefficient S, a color coefficient C and a printing copy number coefficient P, for example, in a manner that a product of these coefficients is calculated and then sum of the respective products is obtained as the print request value. The size coefficient S is a value determined in advance in accordance with a split number of a transfer belt. That is, the split number of the transfer belt is obtained on the basis of some of the setting information stored in the setting information storage unit 13, that is, the sheet size and the sheet feeding direction, and then the size coefficient S corresponding to the obtained split number is obtained. Table 2 is a diagram showing examples of the size coefficient S. In this figure, the term "longitudinal" represents a case where the sheet feeding direction is the longitudinal direction of the sheet and the term "transverse" represents a case where the sheet feeding direction is the transverse direction of the sheet. For example, when the information that the sheet size is A4 and the sheet feeding direction is the longitudinal direction is stored in the setting information storage unit 13 as the setting information, for example, the transfer belt split number will be 8 and the size coefficient S corresponding thereto will be 0.13.

The color coefficient C is a correction value used when the operation of the photosensitive drum differs between the Black & White printing operation and the color printing operation. In the color printer shown in FIG. 3, for example, all of the image forming units operate at both the Black & White and color printing operations, so that the color coefficient C is set to be 1. The number of printing copies set in the setting information storage unit 13 as the setting information is used as the printing copy number coefficient P.

These coefficients are set at every page to be printed or at every print request. Then the product of these coefficients is calculated at every page to be printed or at every print request and then the sum of the respective products having been calculated heretofore is obtained as the print request value.

That is, the print request value will be represented by the following expression.

$$\Sigma i(Si \times Ci \times Pi)$$

where i=1, --, n. The symbol n represents the total page number to be printed based on all of the print requests when the coefficients are set at every page, while the symbol n represents the total number of the print requests when the coefficients are set at every print request. In this case, the product of the page number and the number of printing copies may be used as the printing copy number coefficient P.

As to the coefficients such as the size coefficient S which is set from the setting information, the printer may be configured in a manner that a table such as one shown in Table 2 is prepared in advance and then the coefficient is obtained by referring to the table on the basis of the setting information. When the setting information is given as numerical values, the printer may be configure so that the coefficient is calculated from these numerical values. While an example of the calculation method of the print request value is described above, the print request value may be obtained by taking another element into consideration or may be obtained by another calculation expression. For example, when the printer is one being able to perform only Black & White printing by using a sheet with a predetermined size, the print request value may be obtained merely as the sum of respective products of the number of printing copies and the page number.

The operation of the high-speed color printer shown in FIG. 3 will be explained as an example of the printer. Such a printer seems to be used in general at a central printing room, for example. In this case, most of users work at positions relatively away from the central printing room, and hence each user will go to the room to take for a printed sheet in some case and will receive a printed sheet by mail within the company. Thus, these users are tolerant as to the waiting time except for a particular case. In contrast, users treating matters of urgency or working at the section treating the same desire to make the waiting time minimum rather than decreasing cost. In order to satisfy such a requirement, the printer may be configured to add a priority coefficient U as a setting information. For example, the priority coefficient U may be set to be 1 when users treat matters of normal urgency or work at the section treating the same, while the priority coefficient U may be set to be 10 when users treat matters of urgency or work at the section treating the same. In this case, the print request value will be obtained by the following expression.

$$\Sigma i(Si \times Ci \times Pi \times Ui)$$

In a time period such as holiday or night where users using the printer is few, the number of print request is few and so the print request value does not reach to the printing operation boundary value set by the manager for a long time, so that the printed sheet may be delivered too late. In order to prevent such a delay, a maximum waiting time period is set as another value of the printing operation boundary value. Further, the time at which the printer 11 received the print request is stored as a request start time (TR). Then, a difference (T-TR) between the stored request start time (TR) and a current time (T) is calculated. When the difference exceeds the maximum waiting time period, the printer may start the printing operation even if the print request value does not reach the printing operation boundary value. In this case, when the print request has already been issued, the printing operation may be performed continuously as to the issued print request and another print request in a waiting state, whereby the printing cost can be reduced just a few. Further, the printer may be configured in a manner that the product of the degree of the urgency and the difference between the request start time and the current time may be calculated, and the product may be compared with the set maximum waiting time period. In this case, it is possible to set the waiting time period in accordance with the degree of urgency.

The printer may be configured in a manner that various printing operation boundary values other than the aforesaid maximum waiting time period may be set so that each of the various printing operation boundary values is compared with the print request value thus calculated to thereby determine whether the printing operation is to be started or not. In this case, the printer may also be configured in a manner that it is determined whether each of the print request values exceeds the corresponding printing operation boundary value or not, and then it is determined whether the printing operation is to be started or not by referring the obtained determination result to a logical condition.

According to the present invention, there are many cases to perform the printing operations continuously in response to a plurality of the printing requests. In this case, there are various methods for determining the order of starting the printing operations responding to the printing requests. For example, the printing operations may be performed in the order of the arrival of the print requests, or in the order of the print requests of the minimum total number of sheets to be printed, or in the order of the print requests with highest priority.

While, in the aforesaid embodiment, the printer is configured that all of the constitutional elements such as the image signal storage unit 12 etc. are provided unitedly, it will be clear that the printer may be configured in a manner that a control section including the image signal storage unit etc. and the image output unit 19 are separately provided. Further, while, in the embodiment of FIG. 1, the printer is connected to the network 20, the network 20 may be a communication line or a public line. Furthermore, the printer may not be connected to the network but may be configured to receive many print requests.

As set out above, according to the present invention, the printer is controlled so that sheets are continuously printed as many as possible, the printing cost per one sheet can be decreased. Further, since the printing operation may be controlled in view of the degree of urgency or the waiting time period or the like, the printing operation can be performed conveniently even in a case of performing urgent printing or in a time period where users using the printer is few, so that the present invention is advantageous in that the printing cost can be saved to a large extent in average.

TABLE 1

| continuously printed sheet number | 1 | 2 | 5 | 10 | 50 |
|---|---|---|---|---|---|
| seam detection (sec) | 10.0 | 10.0 | 10.0 | 10.0 | 10.0 |
| image forming/printing (sec) | 5.0 | 6.3 | 10.0 | 16.3 | 66.3 |
| cleaning operation (sec) | 10.0 | 10.0 | 10.0 | 10.0 | 10.0 |
| total operation time (sec) | 25.0 | 26.3 | 30.0 | 36.3 | 86.3 |
| operation per one sheet (sec) | 25.0 | 13.1 | 6.0 | 3.6 | 1.7 |

TABLE 2

| | split number of transfer belt | size coefficient S |
|---|---|---|
| longitudinal of A4 | 8 | 0.13 |
| transverse of A4 | 6 | 0.17 |
| transverse of B4 | 5 | 0.20 |
| transverse of A3 | 4 | 0.25 |

What is claimed is:

1. A printer for continuous printing, comprising:

storage means for temporarily storing image information and setting information, boundary value storage means for storing a boundary value for starting a continuous printing operation, calculation means for calculating a print request value, wherein said print request value represents a sum of a product of coefficients corresponding to said setting information stored in said storage means, comparison means for comparing said boundary value stored in said boundary value storage means with said print request value calculated by said calculation means to provide said continuous printing operation, and control means for performing control operation to perform said continuous printing operation when it is determined by said comparison means that said print request value exceeds said boundary value.

2. The printer of claim 1, wherein said setting information includes information representing a period required for the continuous printing operation, and said calculation means calculates said print request value on the basis of said setting information representing said period required for the continuous printing operation.

3. The printer of claim 2, wherein said period required for the continuous printing operation is selected from a group of a color mode, sheet size, sheet feeding direction, and number of printing copies.

4. A printer, comprising:

storage means for temporarily storing image information and setting information, wherein said setting information includes a request start time, when an operator requests printing;

boundary value storage means for storing a boundary value for starting a printing operation, wherein said boundary representing a maximum waiting time;

calculation means for calculating a print request value on the basis of said setting information stored in said storage means, said calculation means includes means for calculating a time difference between said request start time and a current time;

comparison means for comparing said boundary value stored in said boundary value storage means with said print request value calculated by said calculation means, wherein said comparison means compares said time difference with said maximum waiting time and;

control means for performing a control operation to perform said printing operation when it is determined by said comparison means that said print request value exceeds said boundary value, wherein said control means starts said printing operation when said time difference exceeds said maximum waiting time.

5. A printer, comprising:

storage means for temporarily storing image information and setting information, wherein said setting information includes said information representing a period required for a printing operation and information representing a degree of urgency of printing;

boundary value storage means for storing a boundary value for starting printing operation;

calculation means for calculating a print request value on the basis of said setting information stored in said storage means, said calculation means includes means for calculating said print request value on the basis of said setting information as to said period required for said printing operation, means for calculating a product of coefficients corresponding to said information representing said period required for the printing operation and said information representing the degree of urgency of printing, and means for calculating a sum of respective products to obtain said print request value thereby;

comparison means for comparing said boundary value stored in said boundary value storage means with said print request value calculated by said calculation means; and control means for performing control operation to perform said printing operation when it is determined by said comparison means that said print request value exceeds said boundary value.

6. A method for continuous printing, comprising the steps of:

temporarily storing image information and setting information, storing a boundary value for starting a continuous printing operation, calculating a print request value representing a sum of a product of coefficients corresponding to said setting information stored, comparing said stored boundary value with said calculated print request value, and performing a control operation for said continuous printing operation when said print request value exceeds said boundary value.

7. The printing method of claim 6, wherein said setting information includes information representing a period required for the continuous printing operation, and the step of calculating said print request value includes the substep of considering said setting information.

8. The printing method of claim 7, further including the step of selecting said printing required for the continuous printing operation from a group of a color mode, sheet size, sheet feeding direction, and number of printing copies.

9. A printing method, comprising the steps of:

temporarily storing image information and setting information, wherein said setting information includes information representing a period required for a printing operation and information representing a degree of urgency of printing;

storing a boundary value for starting said printing operation;

calculating a print request value based on said setting information said calculation step includes the substeps of calculating a product of coefficients corresponding to said information representing said period required for said printing operation and said information representing the degree of urgency of printing, and calculating a sum of respective products to obtain said print request value;

comparing said stored boundary value with said calculated print request value; and performing a control operation for said printing operation when said print request value exceeds said boundary value.

10. A printing method, comprising the steps of:

temporarily storing image information and setting information, storing a boundary value for starting a printing operation, wherein said boundary value represents a maximum waiting time; p1 calculating a print request value on the basis of said setting information, wherein said setting information includes a request start time indicating when the operator requests printing;

comparing said stored boundary value with said calculated print request value;

performing a control operation for said printing operation when said print request value exceeds said boundary value;

calculating a time difference between said request start time and a current time;

comparing said time difference with said maximum waiting time; and starting said printing operation when said time difference exceeds said maximum waiting time.

* * * * *

UNITED STATES PATENT AND TRADEMARK OFFICE
CERTIFICATE OF CORRECTION

PATENT NO. : 5,613,784
DATED : March 25, 1997
INVENTOR(S) : Koji OHASHI

It is certified that error appears in the above-indentified patent and that said Letters Patent is hereby corrected as shown below:

In claim 10, Column 11, line 17, delete "p1"; "calculating" should begin a new paragraph.

Signed and Sealed this

Twenty-first Day of April, 1998

*Attest:*

BRUCE LEHMAN

*Attesting Officer*  *Commissioner of Patents and Trademarks*